United States Patent [19]
Johnson et al.

[11] Patent Number: 5,750,234
[45] Date of Patent: May 12, 1998

[54] INTERIOR AUTOMOTIVE LAMINATE WITH THERMOPLASTIC LOW GLOSS COATING

[75] Inventors: John R. Johnson, Valparaiso, Ind.; Diana M. Mercier, Novi, Mich.

[73] Assignee: Avery Dennison Corporation, Pasadena, Calif.

[21] Appl. No.: 660,908

[22] Filed: Jun. 7, 1996

[51] Int. Cl.$^6$ .................... B32B 5/16; B32B 3/30
[52] U.S. Cl. .................... 428/141; 428/149; 428/143; 428/156; 428/203; 428/204; 428/207; 428/41.8; 428/42.1; 428/421; 428/331
[58] Field of Search .................... 428/149, 141, 428/143, 156, 203, 204, 207, 41.8, 42.1, 421, 331

[56] References Cited

U.S. PATENT DOCUMENTS

| | | | |
|---|---|---|---|
| 4,804,572 | 2/1989 | Bodrogi | 428/195 |
| 4,902,557 | 2/1990 | Rohrbacher | 428/215 |
| 5,001,000 | 3/1991 | Rohrbacher et al. | 428/216 |
| 5,055,346 | 10/1991 | Rohrbacher | 428/216 |
| 5,203,941 | 4/1993 | Spain et al. | 156/209 |
| 5,284,693 | 2/1994 | Spain et al. | 428/172 |
| 5,405,675 | 4/1995 | Sawka et al. | 428/195 |
| 5,518,786 | 5/1996 | Johnson et al. | 428/40.6 |

*Primary Examiner*—William Watkins
*Attorney, Agent, or Firm*—Christie, Parker & Hale, LLP

[57] ABSTRACT

An interior automotive skin material comprises a thermoplastic resinous base coat/clear coat paint film bonded to the outer surface of a thermoplastically formable semi-rigid resinous backing sheet. The base coat/clear coat paint film is preferably formed by dry paint transfer techniques in which the clear coat layer and pigmented base coat layer are coated on a polyester carrier and dried, followed by transfer-laminating the base coat/clear coat paint film from the carrier to the backing sheet on which the clear coat layer forms a low gloss protective outer surface. The clear coat material preferably comprises an alloy of an acrylic resin and a fluoropolymer resin, preferably polyvinylidene fluoride. The low surface gloss of the outer clear coat is produced by a dispersed fine particulate filler such as silica combined with coating the outer clear coat layer on a matte carrier. Thermoforming of the composite laminate to a three-dimensionally shaped contour lowers the surface gloss of the outer clear coat to an extremely low 60 degree gloss level of less than about 15 units, more preferably less than about 10 gloss units. In one embodiment, the gloss level is less than about 2 gloss units.

18 Claims, 2 Drawing Sheets

INTERIOR AUTOMOTIVE LAMINATE WITH THERMOPLASTIC LOW GLOSS COATING

FIELD OF THE INVENTION

This invention relates to the use of dry paint transfer techniques for producing an interior automotive skin material for coating functional interior components that cover instrument panels, door panels, and the like. More particularly, the invention relates to the production of an extremely low gloss dry paint transfer sheet that can be made into complex-shaped components for automobile interiors by conventional thermoforming techniques. The invention is environmentally sensitive in that the skin product is recyclable and avoids solvent evaporation problems associated with spray painting such interior automotive skin materials.

BACKGROUND OF THE INVENTION

Automotive interiors present a unique set of problems in the painting of certain components. For example, automobile dashboards can be exposed to high levels of heat and ultraviolet radiation which can detrimentally affect their appearance over time. Furthermore, in order to avoid causing glare, which can be annoying to passengers and dangerous to the driver of an automobile, low gloss finishes for components such as dashboard skin components are desired.

While vinyl compounds such as PVC have been used for such applications, such compounds require large amounts of heat and light stabilizers to avoid adverse weathering effects. Such stabilizers have a tendency to migrate out of the coating material and form a haze over the automobile interior, resulting in an undesirable phenomenon known as "fogging." Furthermore, because they are difficult to recycle, there is a desire to minimize the use of PVC components. A low gloss non-PVC material that is cosmetically acceptable, color stable and durable is desired for use in forming skin components for automotive interiors.

Other skin components for automotive interiors have used urethane paint coats, sometimes with filler particles to lower the gloss level of the outer surface. However, these paint systems are principally thermosets applied by conventional automotive spray paint techniques and therefore contribute to the environmental problems of non-recyclability and solvent emissions.

SUMMARY OF THE INVENTION

Briefly, one embodiment of this invention comprises a plastic part for use as an interior automotive skin component which comprises a thermoplastic resinous base coat/clear coat paint film bonded to the outer surface of a thermoplastically formable semi-rigid resinous backing sheet. The base coat/clear coat paint film is preferably formed by dry paint transfer techniques in which the clear coat layer and pigmented base coat layer are first coated on a polyester carrier and dried. The base coat/clear coat paint film is then transferred from the carrier and laminated to the backing sheet on which the clear coat layer forms a low gloss protective outer surface. The clear coat material preferably comprises an alloy of an acrylic resin and a fluoropolymer resin, preferably polyvinylidene fluoride. The low surface gloss of the outer clear coat is produced by a uniformly dispersed fine particulate filler such as silica in combination with coating the clear coat layer on a low gloss matte carrier. This combination produces a desirable tactile feel to the low gloss surface owing to the presence of microroughness in the filler-enhanced outer clear coat and the matte carrier. The surface gloss also is produced uniformly across the surface of the skin material with minimal gloss variation. The composite laminate is thermoformable to a three-dimensionally shaped contour in which the outer clear coat has an extremely low 60 degree gloss level of less than about 15 gloss units, more preferably less than about 10 gloss units. In one embodiment, the gloss level can be less than about 2 gloss units.

The invention thus provides a non-PVC thermoplastic contoured interior automotive skin component that avoids the recycling problems and heat and light stabilizer problems of vinyl coated interior parts. The invention also provides an automotive interior part with a desirable glare-reducing extremely low gloss finish that can be made by a reasonably high speed and cost effective process. The product also has good mar and abrasion resistance, stain and other chemical resistance, and resistance to UV degradation required for these functional automotive skin products.

These and other aspects of the invention will be more fully understood by referring to the following detailed description and the accompanying drawings.

DETAILED DESCRIPTION

Figure 1:
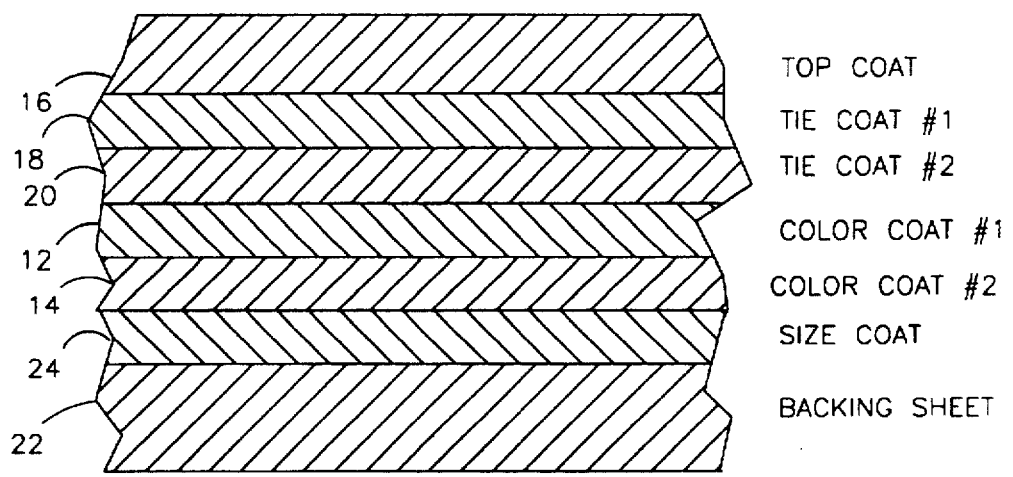
FIG. 1 is a schematic cross-sectional view illustrating the components of one embodiment of a dry paint transfer laminate for providing an interior automotive skin material according to this invention.
Figure 2:
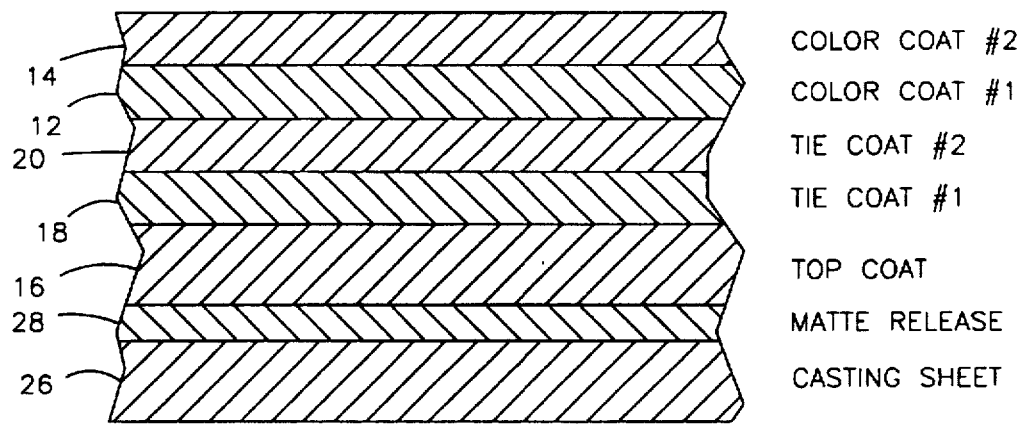
FIG. 2 is a schematic cross-sectional view illustrating a process for producing the layers of the dry paint transfer laminate during its production.

The decorative dry paint transfer laminate of the present invention is made by a multi-stage coating process. FIGS. 1 and 2 are schematic cross-sectional views illustrating the layers of a low gloss dry paint transfer laminate. FIG. 1 illustrates the layers of the transfer laminate as ready to be thermoformed into a desired three-dimensional contoured shape for forming an automotive skin component. This component is the type to be applied to a substrate in a process for manufacturing a functional interior component for covering mechanical parts of the automotive interior such as instrument panels, door panels and the like. These skin components because of their functional nature are to be distinguished from the purely aesthetic interior trim parts which do not have the same rigorous automotive specifications for wear resistance, stain resistance and UV resistance, for example. FIG. 2 illustrates the layers of the transfer laminate during its production. This transfer sheet includes first and second color coat layers 12 and 14. A low gloss top coat 16 is bonded to the first color coat by intervening first and second tie coats 18 and 20. The top coat, also referred to as an outer clear coat, provides a protective outer coating for the underlying color coats. The color coats are bonded to a backing sheet 22 by a size coat 24. While the color coats generally described are solid color coats, it is clear that patterned color coats may also be used. For example, a wood grain color coat may be desirable in some applications.

During its production, the various layers are applied in reverse order on a temporary casting sheet 26. In a preferred embodiment, the casting sheet has a matte finish such as that provided by a chemical matte layer applied as a low gloss coating to a baseweb, or a matte polyester baseweb in which the low gloss surface is produced by embossing techniques. The top coat is applied to the casting sheet, followed by the application of the first and second tie coats and the first and second color coats, in that order.

The backing sheet 22, which has been provided with a size coat, is then heat laminated to the second color coat. The temporary casting sheet with its matte release layer is then stripped from the transferred laminate to expose the outer clear coat layer as a surface finish for the composite product, producing the paint film composite structure shown in FIG. 1. The paint film composite is then thermoformed to a desired three-dimensionally contoured configuration which produces the desired low gloss level of the finished product.

In another embodiment, the paint film is laminated to a sheet of a foamed polymeric material either by heat lamination or by the use of an adhesive. The foamed layer can comprise one or more foamed thermoplastic olefins (TPO), including a foamed polypropylene. A thin layer of a foamed polyolefin can be used to separate the foamed substrate material from the upper paint coatings. Then the combined sub-layers and paint film can be thermoformed to the desired shape. The contoured laminates made by the present invention can be used directly as interior automotive skin components or they can be bonded to underlying structural supporting substrates by known techniques.

The low gloss finish for the laminate is achieved by the use of a top coat which preferably contains uniformly dispersed filler particles. In the preferred embodiment, silicon dioxide is used as the filler. Enough filler should be added to the clear top coat to control the desired low gloss level.

One surprising discovery of the present invention is that by using a top coat that contains a dispersion of filler particles, a low gloss dry paint transfer laminate can be made after casting the outer clear coat on a high gloss casting sheet. When a high gloss casting sheet is used, the smooth finish of the casting sheet is temporarily imparted to the top coat, making the dry paint transfer laminate appear glossy when the casting sheet is removed. However, upon applying the dry paint transfer laminate to the backing sheet 22 and thermoforming the composite of the transfer sheet and backing sheet into the desired shape of the finished article, the previously high gloss finish is reduced to a low gloss finish.

While a low gloss finish can be achieved even with the use of a high gloss casting sheet, in a preferred embodiment the low gloss surface of the dry paint transfer laminate is further enhanced by using a temporary casting sheet having a matte (low gloss) finish. For example, a matte polyester baseweb can be used as the casting sheet. In another embodiment, a matte finish temporary casting sheet is made by coating a polyester casting sheet with a thermoset chemical matte release coat. Use of a temporary casting sheet with a matte coat causes the low gloss finish of the temporary casting sheet to be replicated onto the outer surface of the top coat which is coated onto the matte surface. When a matte casting sheet is used, the outer clear coat surface of the dry paint transfer laminate has a matte finish, even before the laminate has been thermoformed. Because increased levels of filler can make the top coat soft, and therefore somewhat susceptible to scratching and marring, in a preferred embodiment the desired low gloss level in the outer clear coat is achieved by a proper balancing of the use of a matte finish casting sheet and a top coat containing the finely divided filler particles. A much lower amount of filler is used in the outer clear coat layer when compared with casting on a high gloss carrier to achieve the same or similar low gloss level. By using the lower filler content, mar and abrasion resistance of the clear coat are improved, as previously mentioned.

In one embodiment the outer clear coat solids comprise the combination of polyvinylidene fluoride (PVDF) and an acrylic resin. The amount of filler contained in the top coat formulation can be less than about ten parts by weight of filler per one hundred parts by weight of total resin binder contained in the polymeric outer clear coat formulation. If higher levels of filler are added, the top coat generally becomes too soft, making it susceptible to scratching and marring. In a more preferred embodiment, less than about five parts filler per one hundred parts resin binder are used in the top coat, by weight, based on the total solids present in the filler/binder component of the clear coat composition. Such a combination provides exceptional scratch and mar resistance while providing an attractive, low gloss finish. The preferred low gloss is produced when casting these filler-enhanced coatings on matte carrier sheets, as described below.

Once formed, the dry paint transfer laminate of the present invention can be applied to a substrate by conventional thermoforming techniques to make a shaped article having the desired low gloss. Once thermoformed, the article has a low gloss finish that is very durable. Articles formed in this way are not only scratch and mar resistant, but they are also resistant to high temperatures and ultraviolet exposure, making them ideal for use in dashboards and other components for automotive interiors. A low gloss finish such as that provided by this invention is especially desirable for automotive dashboards because the low finish reduces glare. Furthermore, because the dry paint transfer sheet does not include PVC, it is easier to recycle such components. Finally, unlike the PVC products that are typically used to coat automobile interior components, the components made using dry paint transfer sheets of the present invention will greatly reduce fogging.

In one embodiment, a matte polyester baseweb 26 is used as the temporary matte casting sheet. This baseweb can be 98 gauge polyester sheet, the surface of which has been embossed by an embossing roll during the extrusion process for making the casting sheet in order to impart a matte finish to its surface. Another matte polyester casting sheet can be a polyester carrier having a measured 60 degree gloss reading of 16.8 gloss units, in which the matte polyester carrier is part of the 2000 Series Hoechst casting sheets.

In another embodiment, a process for making a low gloss casting sheet includes coating a matte release coat in thin film form onto the surface of a flexible, foldable, heat-resistant, substantially inelastic, self-supporting temporary casting sheet. The casting sheet is preferably a 92 gauge, high gloss, oriented polyester casting sheet such as Mylar (a trademark of DuPont), Hoechst Celanese Hostaphan 2000 polyester film, or the like.

The casting sheet is coated with the matte release coat by conventional methods such as by roller coating or gravure printing processes. The preferred matte release coating composition is a thermosetting resinous material which, when exposed to heat during a drying step, becomes crosslinked and permanently bonded as a surface film adhered to the casting sheet. The solids contained in the matte release coat preferably include, as a principal component, one or more crosslinking agents to provide good adhesion of the dried crosslinked coating to the polyester casting sheet.

In one embodiment, the matte release coat formulation includes a primary crosslinking resin such as a vinyl resin that bonds to the casting sheet. A suitable vinyl resin is a medium molecular weight vinylchloride-vinylacetate resin known as VAGH, described in more detail in Example 1 below. This vinyl resin can be present in an amount up to about 20% of the total solids in the matte release coat. In addition, the matte release coat can include a secondary crosslinking resin to improve release of the top coat from the matte release coat. In one embodiment, the secondary crosslinking resin can be an acrylic modified alkyd resin such as the resin described in more detail in Example 1. This secondary crosslinking resin comprises from about 1% to about 15% of the total solids of the matte release coat. The matte release coat further includes a suitable catalyst for accelerating the crosslinking process, typically comprising from about 1% to 2% of the total solids in the matte release coat.

The resinous components of the matte release coat composition are mixed with suitable solvents for application to the casting sheet. In one embodiment, the resins are mixed with a primary resin solvent such as methyl isobutyl ketone (MIBK) which comprises about 65% to about 85% of the total solvent in the formulation. A secondary resin solvent such as isopropyl alcohol (IPOH) is useful in retarding crosslinking of the resins in solution. The secondary resin solvent preferably comprises from about 5% to about 20% of the total solvent.

The matte release coat formulation is prepared by dissolving the primary crosslinking resin in the primary and secondary resin solvents by mixing, and then adding the secondary crosslinking resin together with a primary matting agent, preferably in the form of a filler comprising a fine particulate inert inorganic material. In one embodiment, the filler comprises aluminum silicate with an average particle size of about 4.8 microns. The filler contained in the formulation comprises up to about 25% of the total solids in the matte release coat. The fine particulate filler is thoroughly dispersed in the resin and resin solvent blend, preferably under elevated temperatures from about 100° to about 120° F.

When the matte release layer dries and crosslinks, it forms a chemical matte coating on the surface of the carrier sheet. The matte surface is controlled by the amount and particle size of the filler. The fine particles project through the dried exterior surface of the matte release coat to form, on a microscopic scale, a surface with a microroughness that transfers to the surface of the dried top coat a replicated microroughness that produces light-scattering, resulting in a low surface gloss on the top coat. Since the matte finish is bonded to the casting sheet in order to impart a microroughness to the top coat, it does not form a part of the finished dry paint transfer sheet. Therefore, the inclusion of vinyl compounds in the matte finish does not adversely affect the recyclability of the products using the dry paint transfer sheet of the present invention.

The matte release coat formulation also includes a release agent to enhance the release of the casting sheet and its matte release coat from the top coat after the dry paint transfer sheet has been completed. The release agent preferably includes a wax component such as a polyethylene wax which melts at elevated temperatures to allow easy hot release of the release coat. Such a wax component is suspended in the matte release coat at normal temperatures. In its suspended or particulate form, the wax acts as a matte agent to enhance transfer of the low surface gloss to the top coat. A preferred polyethylene wax is Shamrock S-381-N1 (described in Example 1 below), which has a melting point of about 206° F. Stripping of the release-coated carrier is preferably carried out at temperatures more than about 80° F. above the melting point of the wax, to enhance release properties. The wax, which melts at relatively higher temperatures as it dries, can have a crystalline or semi-crystalline structure. At relatively lower temperatures it is believed to crystallize and reform particles which affect the matte transferred to the top coat. In one preferred form of the matte release coat formulation, the polyethylene wax comprises from about 12% to about 25% of the solids contained in the matte release coat.

The release agent contained in the matte release coat formulation further includes a silicone resin component which combines with the polyethylene wax to enhance free release of the clear coat from the matte release coat at elevated temperatures. In one embodiment, the silicone resin comprises from about 2.5% to about 25% of the solids contained in the matte release coat formulation. Release is improved and lower gloss is transferred when the wax and silicone resin are used in combination in the matte release coat.

The casting sheet containing the matte release coat is dried by conventional means such as by an impinging air oven operated at a temperature from about 200° F. to about 250° F., for a sufficient time for drying and crosslinking the matte release coat. Once sufficiently crosslinked, the matte release coat becomes permanently bonded to the casting sheet. Preferably, the matte release coat is coated and dried to produce a coat weight (dry) from about 6 to about 12 g/m$^2$. This chemical matte casting sheet has a measured 60 degree gloss reading of 8.7 gloss units. After the matte release coat has been applied to the casting sheet, a top coat layer can then be applied.

The top coat is cast to the surface of the casting sheet by conventional methods such as by a reverse-roll coating process. The top coat is preferably a transparent clear coat, although it can be pigmented. If pigmented, it is preferred that the pigmentation be at a sufficiently low level that underlying paint coats are visible through the top coat.

Preferably, the top coat is a thermoplastic and thermoformable lacquer formulation that produces a dry film form, durable coating having desired properties of hardness and abrasion resistance, along with UV resistance. In one embodiment, the top coat is formulated from a thermoplastic synthetic resinous coating which replicates the microroughness from the matte release coat to produce the desired low gloss surface for the finished product. The top coat preferably comprises a blend of a thermoplastic fluorinated polymer and a thermoplastic acrylic resin as its principal components. The fluorinated polymer component is preferably a thermoplastic fluorocarbon resin, such as polyvinylidene fluoride (PVDF). The fluorinated polymer resin also can include copolymers and terpolymers of vinylidene fluoride or polyvinyl fluoride, or mixtures thereof. One thermoplastic fluorocarbon useful as the top coat is the PVDF known as Kynar, a trademark of Elf Atochem. This polymer is a high molecular weight polymer which provides a useful blend of durability and chemical resistance properties. The PVDF component preferably comprises from about 40% to about 70% by weight of the total PVDF and acrylic resin solids present in the top coat.

The acrylic resin component of the top coat can be a polymethylmethacrylate or a polyethylmethacrylate resin, or mixtures thereof, including methacrylate copolymer resins, and minor amounts of other comonomers. The top coat also can include minor amounts of block copolymers and other compatibilizers to stabilize the blended PVDF and acrylic resin system and provide compatibility with the underlying paint film.

In one embodiment, a principal component of the acrylic resin contained in the top coat is a medium molecular weight polyethylmethacrylate resin such as Elvacite 2042, a trademark of DuPont. This acrylic resin clarifies the top coat, hardens the top coat, and improves adhesion to the underlying color coats. In its preferred form, the acrylic component comprises from about 30% to about 60% of the total solids contained in the top coat formulation.

The top coat also includes a finely divided particulate filler which helps provide the matte finish to the finished product. Preferably, silicon dioxide is used as the filler. In the preferred embodiment, the silicon dioxide filler, sold under the trademark TS 100 from the Degussa Corporation, is dispersed uniformly in the clear coat material. This filler has a particle size range from about one to about nine microns with an average particle size of about four to five microns. The filler is preferably contained in the clear coat material in an amount below about ten parts filler per 100 parts binder resin by weight, based on the total solids present in the mixture. The preferred filler level is less than five parts and more preferably less than about two parts per one hundred parts resin.

The PVDF and acrylic based top coat formulation can be prepared as a dispersion of the PVDF and a solution of the acrylic resin. In one embodiment, the top coat formulation is prepared by mixing the acrylic resin with a suitable organic solvent and applying heat to dissolve the resin. The mixture is then allowed to cool sufficiently before adding the PVDF component and filler, so that the PVDF will not dissolve, but will be maintained as a dispersion with the filler in the acrylic-solvent based mixture. By maintaining the PVDF component as a dispersion in the top coat, solvent evaporation during drying of the top coat can be improved. Suitable solvents and the amounts of solvent used are set forth below in Example 1.

Other minor components of the top coat formulation can include UV absorbers such as Tinuvin 234, a benzotriazole UV absorber available from Ciba-Geigy, comprising up to about 3% of the total solids, and a dispersing agent such as Solsperse 17000 (trademark of ICI Americas) useful for reducing the viscosity of the dispersion coating. The dispersing agent preferably comprises up to about 4% of the PVDF component.

Once cast, the top coat is dried by conventional means. Preferably a multiple stage impinging air oven is used to dry the top coat. The different drying zones of the oven can be controlled at different temperatures depending upon the drying characteristics of the top coat. The top coat is preferably dried and fused at an oven air temperature of about 350° F. for about 2 minutes to form a durable clear coat on the matte release film. The preferred dry film thickness of the top coat is about 0.3 to about 1.5 mils.

One or more tie coats are then applied to the top coat. In this embodiment, a single tie coat is applied by a gravure printing process. The tie coat improves the bond between the top coat and the underlying color coats. Preferably, an acrylic resin tie coat is used, and the preferred acrylic resin is a solvent-based Elvacite 2042 adhesive resin formulation. The tie coats are preferably dried in a multiple stage impinging air oven at a temperature of about 200° F. for about 20 seconds. If more than one tie coat is provided, the first tie coat is fully dried before the second tie coat is applied. Each tie coat is preferably about 0.1 mils thick when dry.

One or more color coats are then applied to the dried tie coat to provide the desired color to the transfer sheet. Preferably, two color coats are applied by a gravure printing process. Each color coat preferably comprises a thermoplastic and thermoformable polymeric binder material containing uniformly dispersed pigments. The preferred color coat is made of a coating containing an acrylic resin that contains a sufficient level of pigment to provide the desired color for the finished product and also to improve the finished product's resistance to UV degradation. A liquid cast, weatherable color coat containing an acrylic polymer is preferred. In one embodiment, the color coat contains a blend of PVDF and an acrylic resin, such as polymethylmethacrylate or polyethylmethacrylate. The ratios of PVDF to acrylic resin solids contained in the blend or alloy are similar to those described previously for the top coat formulation. The color coats are dried in a multiple stage impinging air oven at a temperature of about 200° F. for about 20 seconds. The first color coat is hardened before the second color coat is applied. Each layer of color coat is cast to a thickness of about 0.1 mils (dry).

The backing sheet preferably comprises a thermoplastic and thermoformable polymeric material in thin flexible sheet form. The backing sheet is preferably a semi-rigid polymeric sheet from about 10 to 60 mils in thickness, the preferred thickness being about 20 to 30 mils. A thermoplastic polyolefin (TPO) sheet is most preferred. This backing sheet is produced from a TPO resin sold under the name KS-350 which is supplied by Montel Corp. of Wilmington, Del. A preferred polyolefin material for the backing sheet comprises polypropylene.

A size coat is bonded to the backing sheet as a bonding layer for adhering the backing sheet to the dry paint transfer film. The size coat comprises any of various suitable coating compositions to provide adhesion of the dry paint film to the backing sheet. The size coat is preferably made from an adhesive coating composition capable of bonding to the backing sheet. A preferred size coat comprises copolymers of PMMA and an olefin. Such a size coat formulation is sufficient for providing a good bond between the dry paint sheet and the substrate. Although a CPO size coat can be used, non-chlorinated size coats are preferred when compared with CPO because weatherability is better.

The dry paint transfer laminate is then transferred to the backing sheet by dry paint transfer lamination techniques. The laminate, while supported by the carrier sheet, is bonded to a surface of the backing sheet which has preferably been coated with a bonding layer of a size coat. A preferred transfer lamination process is described in the FIG. 6 embodiment of PCT Publication WO 88/07416 to Spain et al., which is incorporated herein by this reference. The temporary casting sheet is then stripped from the dry paint laminate. A series of water-cooled chill rollers produce a controlled temperature reduction in the dry paint laminate so as to cool it to a temperature in the range from about 295° to about 340° F. Once cooled to within this range, the temporary casting sheet is stripped from the paint sheet. The preferred stripping temperature is 308° F. If the temperature stays too high, flowability of the paint sheet can cause the microroughness imparted by the matte finish of the temporary casting sheet to smooth out. The temperature drop also enhances the free removal of the paint sheet from the casting sheet. When the matte release coated casting sheet is used, the matte release coat, which has been crosslinked and permanently bonded to the casting sheet, remains adhered to the carrier sheet during the stripping process.

The dry paint transfer sheet (in the form of the laminate shown in FIG. 1) can then be applied to a substrate and thermoformed into the desired shape. The optimum thermoforming temperatures of such sheets are about 330° F. Such a sheet temperature is achieved by a 25 second dwell time in a 500° F. oven. The elongation ranges for the dry paint transfer sheets of the present invention are between about 50% and 150% during thermoforming. The elongation will depend in part on the geometry of the finished product, the depth of draw, and other factors.

If the dry paint transfer sheet is cast on a high gloss temporary casting sheet, the low gloss finish will not be fully realized until after the thermoforming process, which causes a large decrease in gloss level. For dry paint transfer sheets cast on a matte finish casting sheet, the gloss will not change significantly, but will be reduced during thermoforming.

Surface gloss can be measured by various techniques such as ASTM designation D 3679-86, 5.11. A Dorigon gloss meter manufactured by HunterLab or a Byk-Malinckrodt gloss meter are the preferred instruments used to provide instrument precision gloss measurements. Using this surface gloss measurement technique, the outer surfaces of the top coat layer of the dry paint transfer sheets produced according to the present invention have 60 degree gloss levels of less than about 15 gloss units. Preferably, the 60 degree surface gloss is less than about ten gloss units, and more preferably 60 degree surface gloss levels are as low as two gloss units.

The finished product also can be textured in one of several processes to provide a tactile feel to the surface. Texturing can be carried out by an embossing roll or by a textured vacuum-forming tool in which the product being shaped is drawn into the vacuum-forming tool. The texturing can add a grain pattern or the like, but gloss levels are not appreciably reduced. Texturing in a vacuum forming tool is desirable because the product readily replicates the mold and preserves the integrity of the pattern.

In addition to providing a durable low gloss finish for use in producing components for automobile interiors, other advantages of the present invention include the ability for auto makers to eliminate the use of spray coatings on interior components. The dry paint transfer sheets of the present invention can be applied directly to such components during thermoforming, resulting in the elimination of the emission of volatile organic compounds which are released when using conventional spray painting equipment.

The invention will be further explained by the following examples.

EXAMPLE 1

A matte release coat was formulated from the following components:

|  | Component | Parts |
|---|---|---|
| Composition 1: | Methyl isobutyl ketone (MIBK) | 38.3 |
|  | Isopropyl alcohol (IPOH) | 6.7 |
|  | VAGH | 4.8 |
|  | ASP400 | 44.3 |
|  | Lankyd 13-1245 | 5.9 |
|  |  | 100.0 |
| Composition 2: | Methyl isobutyl ketone | 56.7 |
|  | Isopropyl alcohol | 9.0 |
|  | VAGH | 15.1 |
|  | Lankyd 13-1245 | 19.2 |
|  |  | 100.0 |
| Release Coat: | Composition 1 | 41.8 |
|  | Composition 2 | 21.1 |
|  | SR107 | 1.2 |

-continued

| Component | Parts |
|---|---|
| S381-N1 | 5.0 |
| MIBK/IPOH Blend (85/15) | 21.4 |
| Cycat 4040 | 3.8 |
| Cymel 303 | 5.7 |
|  | 100.0 |

1. VAGH is a medium molecular weight, partially hydrolyzed vinyl chloride-vinyl acetate resin (approximately 90% vinyl chloride, 4% vinyl acetate and a hydroxyl content of 2.3%) sold by Union Carbide, Somerset, N.J.

2. ASP400 is an aluminum silicate of average particle size 4.8 microns made by Engelhard Corp., Edison, N.J., and sold by Jensen-Souder, Itasca, Ill.

3. Lankyd 13-1245 is an acrylic alkyd solution available from the Akzo Corp. of East Saint Louis, Ill.

4. SR-107 is a silicone resin manufactured by General Electric, Waterford, Conn., and sold by Fitzchem, Chicago, Ill.

5. S381-N1 is a polyethylene wax sold by Shamrock Chemicals Corp., Newark, N.J.

6. Cycat 4040 is a para toluene sulfonic acid catalyst (40% by weight in isopropanol) sold by American Cyanamid Co., Wallingford, Conn.

7. Cymel 303 is a liquid hexamethoxy-methylmelamine crosslinking agent sold by American Cyanamid.

Composition 1 was produced by dissolving the VAGH resin in a blend of MIBK and IPOH by mixing in a Cowles mixer and then adding the Lankyd 13-1245 and ASP400 while mixing. This mixture was then sandmilled at a temperature of about 110° F. to disperse the ASP400.

A low gloss clear top coat was formulated from the following components:

| Component | Parts |
|---|---|
| Elvacite 2042 Solution | 52.72 |
| Tinuvin 234 | 0.64 |
| Solsperse 17000 | 0.08 |
| TS 100 | 0.20 |
| Kynar 500 Plus (PVDF) | 20.76 |
| Cyclohexanone | 7.68 |
| Exxate 700 | 7.68 |
| Butyrolactone | 10.24 |
|  | 100.00 |

The Elvacite 2042 Solution had the following formulation:

| Component | Parts |
|---|---|
| Elvacite 2042 | 21.20 |
| Exxate 700 | 24.82 |
| Cyclohexanone | 23.64 |
| Butyrolactone | 30.34 |
|  | 100.00 |

8. Elvacite 2042 is a polyethylmethacrylate resin with a weight-average molecular weight of 300,000, sold by DuPont, Wilmington, Del.

9. Tinuvin 234 is a 2-(3$^1$,5$^1$,bis(1-methyl 1-phenylethyl) -2$^1$ hydroxyphenyl) benzotriazole U.V. light stabilizer sold by Ciba Geigy, Hawthorne, N.Y.

10. Solsperse 17000 is a polymeric fatty ester dispersing agent sold by ICI Americas Inc., Wilmington, Del.

11. TS 100 is a silicon dioxide filler with an average particle size of 4 microns, with a range from about 1 to 9 microns, sold by Degussa Corporation.

12. Kynar 500 is a polyvinylidene fluoride polymer sold by Elf Atochem, Philadelphia, Pa.

13. Exxate 700 is a high boiling point acetate solvent sold by Exxon Chemicals.

14. Butyrolactone is used for solubility of the acrylic resin and is a high boiling point Ketone In this embodiment, the filler particles (TS 100) comprised 0.63 parts per one hundred parts resin binder by weight based on the total solids of the PVDF/acrylic resinous binder contained in the top coat formulation.

The Elvacite 2042 Solution was first blended by dissolving the Elvacite 2042 in the solvents Exxate 700, cyclohexanone and butyrolactone.

The Elvacite 2042 Solution, Solsperse 17000 and Tinuvin 234 were then dissolved in the cyclohexanone solvent at a temperature of 130° F. and allowed to cool to room temperature. The PVDF was then dispersed in the resin solution with the TS 100 using a 14 inch Cowles blade at 1800 RPM. The temperature of the PVDF dispersion was kept below 110° F. to avoid gelation of the dispersion. Next, the remaining solvents were preblended before mixing into the PVDF dispersion. In this embodiment, the top coat was not pigmented.

A first acrylic tie coat was prepared from the following components:

| Component | Parts |
|---|---|
| Toluene | 45.00 |
| N-Propyl Acetate | 45.00 |
| Elvacite 2042 | 9.82 |
| Tinuvin 234 | 0.18 |
| | 100.00 |

A second acrylic tie coat used in this example primarily consisted of methylmethacrylate and a smaller amount of cellulose acetate propionate available from Gibraltar Chemical Co. of South Holland, Ill.

An acrylic color coat was prepared by mixing the following components:

| Component | Parts |
|---|---|
| Color Coat Vehicle | 69.11 |
| Metallic Color Coat Vehicle | 9.68 |
| BASF 6930 Blue Dispersion | 3.69 |
| Perylene Maroon Dispersion | 4.40 |
| Black Dispersion | 13.02 |
| Thinner | 0.10 |
| | 100.00 |

The color coat vehicle was prepared by mixing the following components:

| Component | Parts |
|---|---|
| Toluene | 37.70 |
| Methyl Propyl Ketone | 37.70 |
| Isopropyl Alcohol | 8.30 |
| Elvacite 2021 | 13.10 |

-continued

| Component | Parts |
|---|---|
| CAP 482-0.5 Cellulosic | 3.10 |
| | 100.00 |

The metallic color coat vehicle was prepared by mixing the following components:

| Component | Parts |
|---|---|
| Elvacite 2021 | 18.30 |
| CAP 482-0.5 Cellulosic | 4.60 |
| Sanduvor 3050 | 0.45 |
| Sanduvor 3206 | 0.45 |
| Toluene | 34.30 |
| Methyl Propyl Ketone | 34.30 |
| Isopropyl Alcohol | 7.60 |
| | 100.00 |

15. Elvacite 2021 is a methylmethacrylate from DuPont.

16. Cap 482-0.5 is a cellulose acetate propionate available from Eastman Chemical Products, Kingsport, Tenn.

17. Sanduvor 3050 and 3206 are an oxalamide derivative and an oxazoline, respectively, both supplied by Sandoz Chemicals, Charlotte, N.C.

A size coat was prepared from the following components:

| Component | Parts |
|---|---|
| Rohasol PM 555 | 53.16 |
| Cyclohexanone | 23.88 |
| Elvacite 2042 | 7.96 |
| Methylisobutylketone | 15.00 |
| | 100.00 |

18. Rohasol PM 555 is an organic emulsion of copolymers of methacrylic esters and olefins available from the Rohm Tech corporation of Malden, Mass.

The Elvacite 2042 is first added under agitation to the cyclohexanone until it is in solution. The PM 555 and methylisobutylketone are then added.

Preparation of a Dry Paint Transfer Sheet

The matte release coat was gravure coated with a 100 HK gravure cylinder pattern at a coat weight (dried) of 3 g/m$^2$ onto a 92 gauge oriented gloss polyester casting sheet (Hostaphan 2000, available from Hoechst Celanese, Greer, S.C.) at about 100 feet per minute and dried and crosslinked in a 20 foot impinging-air oven at an air temperature of 250° F. (web temperature approximately 220° F.).

Next, the top coat was coated at a coating weight (dried) of 40 g/m$^2$ onto the dried matte release coat by a reverse-roll coater at 40 feet per minute or less. The top coat was dried and fused in a 120 foot three-zone impinging air oven with the air temperatures in the three zones being 250° F., 300° F., and 350° F. This formed a transparent clear coat having a dry film thickness of 1.0 mil on the matte release coat of the casting sheet.

To minimize web shrinkage and avoid distortion of the casting sheet, web tension was maintained below 0.8 lbs/linear inch of web width through the drying ovens. The dried, coated casting sheet was wound as a roll, removed from the first coater and set up on the unwind station of a second coater. The clear-coated side of the casting sheet was then gravure printed at a speed of 100 feet per minute with a series of two tie coats, and two color coats. The drying oven temperature was 200° to 225° F. The dried coat weight of the tie and color coats ranged from 3–5 g/m².

The size coat was then cast onto a separate 92 gauge oriented gloss polyester casting sheet by a reverse roll coating process at a coat weight (dried) of about 10 to 30 g/m² and dried in an impinging-air oven at an air temperature of about 200° F. for about two minutes. The dried size coat was heat laminated to a 20 mil TPO backing sheet, followed by removing the casting sheet. The size coat of the backing sheet was then heat laminated to the second color coat and the composite laminate was stripped from the casting sheet.

The composite laminate was then thermoformed at a sheet temperature of 330° F. This temperature was achieved with a 25 second dwell time at 500° F. Prior to thermoforming, the outer clear coat had a 60 degree gloss value of 9.9 gloss units. After the above dry paint transfer sheet was thermoformed, gloss measurements were taken, and a 60 degree reading of 8.0 gloss units was achieved using the HunterLab Dorigon gloss meter. The finished clear coat had good mar and scratch resistance as measured by General Motors Specification No. GM6073M scratch test.

EXAMPLE 2

A low gloss clear top coat was formulated from the following components:

| Component | Parts |
| --- | --- |
| Elvacite 2042 | 8.44 |
| Tinuvin 234 | 0.48 |
| Solsperse 17000 | 0.06 |
| TS 100 | 2.41 |
| Kynar 500 Plus (PVDF) | 15.67 |
| Cyclohexanone | 21.88 |
| Exxate 700 | 22.36 |
| Butyrolactone | 28.70 |
|  | 100.00 |

This top coat formulation was applied to a 2 mil high gloss polyester casting sheet and dried in an air convection oven using conventional techniques. The tie coats, color coats, size coat and backing sheet were applied as set forth in Example 1. The resulting dry paint transfer sheet had a fairly high gloss initially. A 60 degree gloss measurement showed a reading of 75 gloss units. However, after thermoforming, the gloss had decreased to a reading of 1.8 gloss units at 60 degrees.

EXAMPLE 3

Dry paint transfer sheets according to Examples 1 and 2 were prepared in which the amount of TS 100 filler in the top coat was varied as illustrated in the following table. The amount of TS 100 is expressed as parts of TS 100 per hundred parts of resin solids (PVDF and acrylic combined). The top coats were applied to three different casting sheets: a chemical matte, as set forth in Example 1; a matte polyester comprising a Hoechst 2000 Series casting film; and a high gloss polyester as set forth in Example 2. These dry paint transfer sheets were thermoformed and then tested for gloss using the Dorigon gloss meter. The 60 degree gloss measurements are provided in the following table.

| TS 100 | Chemical Matte | Matte Polyester | High Gloss Polyester |
| --- | --- | --- | --- |
| 0.63 | 9.9 | 36.9 | 57.1 |
| 1.35 | 6.7 | 35.0 | 46.5 |
| 2.51 | 5.6 | 17.9 | 26.8 |
| 4.66 | 3.9 | 10.6 | 22.9 |
| 7.13 | 3.4 | 5.8 | 11.3 |
| 10.00 | 2.8 | 5.5 | 6.8 |

EXAMPLE 4

Dry paint transfer sheets were prepared in which the outer clear coat material contained no filler particles. The laminate was produced according to the methods of Examples 1 and 2, and the clear coat was cast in contact with three separate types of basewebs similar to those used in Example 3: (1) a chemical matte release coated casting sheet; (2) a matte polyester casting sheet; and (3) a high gloss polyester casting sheet.

The unfilled clear coat outer layer was measured for 60° gloss following thermoforming with the following results:

| Chemical Matte | Matte Polyester | High Gloss Polyester |
| --- | --- | --- |
| 14.0 | 38.3 | 75.2 |

The test results show that a generally linear relationship between increase in filler level and reduction of gloss was produced for clear coats cast on each casting sheet.

Generally, the conclusion was that low gloss laminates with good abrasion resistance can be produced with no filler particles but for extremely low gloss laminates having a 60° gloss level below about 10 gloss units, it is preferred to add the filler particles to the coating. In addition, the filler particles in combination with casting on a matte carrier sheet, particularly a chemical matte carrier, produce a surface microroughness which transfers a desirable tactile feel to the end-product in addition to the low gloss level.

EXAMPLE 5

A laminate was produced with an unfilled outer clear coat layer comprising a PVDF homopolymer alloyed with an acrylic resin. The PVDF homopolymer was supplied by Ausimont, U.S.A., and available under the designation Mylar 5000 LG. This particular PVDF resin has a high molecular weight and an inherently low gloss. The PVDF material was alloyed with an acrylic resin to produce a dispersion PVDF/acrylic clear coat material which was cast on both the chemical matte and high gloss polyester basewebs, laminated to a TPO backing sheet and then thermoformed. Sixty degree gloss measurements were 5 gloss units for the outer clear coat on the chemical matte baseweb and about 50 for the high gloss polyester carrier. Because of the extremely low gloss produced by contact with the chemical matte baseweb, this inherently low gloss high molecular weight PVDF resin, enhanced with the filler particles uniformly dispersed, can achieve exceedingly low gloss levels.

EXAMPLE 6

Although the invention has been described in relation to a dry paint film composite laminate having a low gloss base coat/clear coat paint finish with an underlying thermoplastic and thermoformable solid polymeric backing sheet, other embodiments also are contemplated. For instance, it may be possible to carry out the invention with the outer clear coat only, without use of an underlying color coat. In this embodiment the underlying backing sheet would need a level of weather resistance and would incorporate the desired decorative pigment system for an appropriate color match. A size coat system having weather resistance would bond the clear coat to the backing sheet.

A further embodiment of an interior automotive skin component was produced without a color coat but having a low gloss outer clear coat highly loaded with UV absorber to protect the underlying CPO bonding layer, according to the following formulation:

| Component | Parts |
| --- | --- |
| Elvacite 2022 Solution | 58.51 |
| Solsperse 17000 | 0.08 |
| Tinuvin 328 | 2.49 |
| Hylar 5000 LG | 18.60 |
| Cyclohexanone | 6.09 |
| Exxate 700 | 6.09 |
| Butyrolactone | 8.14 |

The Tinuvin 328, available from Ciba-Geigy Corp., is added to the formulation at a level of about 8 parts per hundred parts resin solids.

After 600 kiloJoules xenon weatherometer exposure, there was a Delta E color difference reading of less than 1.0 for a construction that had the above top coat, and a CPO size coat underneath, next to the TPO. After the same exposure period, clear coats with 25% (2 phr) and 50% (4 phr) of the UV absorber level given above showed color change and brown spotting, which indicated degradation due to UV light. There is also some evidence that indicates that the amount of UV absorber per unit volume is the most important factor in preventing degradation. Accordingly, it is believed that increasing the film thickness from its present 1.0 mil level may improve UV results, along with increasing the amount of UV absorber to above about 6 phr. A conclusion is that such a construction, with no color coat, can be used in interior automotive applications.

EXAMPLE 7

Figure 3:
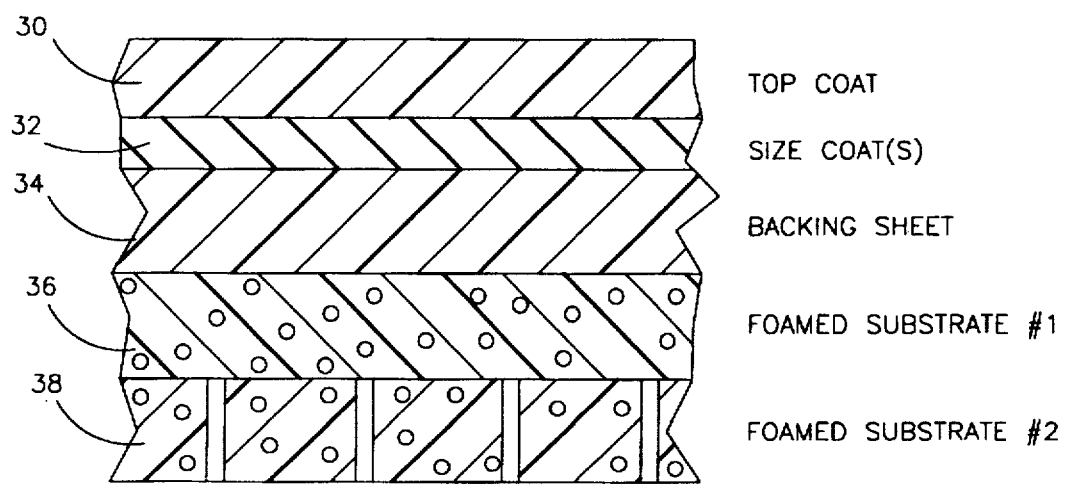
FIG. 3 is a schematic cross-sectional view illustrating an alternative form of the invention which includes a composite foamed substrate.

A further embodiment of the invention provides a composite automotive interior skin component having a foamed or cellular substrate preferably comprising a foamed polyolefin polymer. The preferred construction illustrated in FIG. 3 comprises a PVDF/acrylic outer clear coat layer 30, a chlorinated polyolefin (CPO) size coat 32, a 20 mil thermoplastic olefin (TPO), semirigid backing sheet 34, a 100 mil foamed polypropylene substrate layer 36, and a foamed polyethylene/polypropylene substrate layer 38.

A pelletized polypropylene is available from Toray Corp., Front Royal, Va., under the description "APGG." The pelletized polyethylene/polypropylene is available from JSP International, Malvern, Pa., under the designation "APRO." This material is available in a variety of densities, and the density that was used in this example was 10 pounds per cubic foot. The pellets are placed in a mold which forms a cellular matrix structure that fuses to the backing sheet.

A cellular polyethylene/polypropylene substrate layer was thermoformed into the desired shape, after which vacuum holes were drilled into the shaped material and the shaped material was used as a thermoforming tool on which to draw the TPO layer and the cellular polypropylene layer over the previously formed tool.

Alternatively, the invention having a cellular polymeric substrate layer can be produced in other embodiments such as thermoforming the 20 mil TPO backing sheet and 100 mil cellular polypropylene sheet with the PVDF/acrylic clear coat to produce a mold insert, followed by injection molding behind the TPO to form a more rigid strata bonded to the foamed polypropylene layer.

What is claimed is:

1. A decorative and structural plastic skin component for use as a functional covering for interior automotive instrument panels, comprising a thermoplastically formable dry paint transfer sheet having a protective outer clear coat layer comprising a polymeric material and an underlying base coat layer comprising a polymeric material containing a dispersed pigment, and a self-supporting thermoplastically formable resinous backing sheet adhered to the dry paint transfer sheet on the side thereof opposite from the outer clear coat, the outer surface of the clear coat layer having a transferred mirco-roughness surface to reduce the surface gloss thereof, the composite of the dry paint transfer sheet and the backing sheet having been subjected to thermoforming to thermoplastically elongate and thereby produce thereon a three-dimensionally shaped contoured outer surface, the clear coat layer containing uniformly dispersed filler particles in an amount below about 10 parts by weight per 100 parts of the total resinous binder solids contained in the outer clear coat, the combination of said transferred surface micro-roughness and said dispersed filler particles producing on the outer surface of the thermoformed clear coat layer a substantially uniformly dispersed micro-roughness forming a low gloss having a measured 60 degree gloss level of less than about 15 gloss units.

2. The product according to claim 1 in which the clear coat layer comprises an alloy of a fluoropolymer resin and an acrylic resin.

3. The product according to claim 2 in which the fluoropolymer resin comprises PVDF.

4. The product according to claim 3 in which the amount of filler particles contained in the clear coat comprises less than about ten parts by weight per one hundred parts of the combined PVDF and acrylic resin solids.

5. The product according to claim 1 in which the 60 degree gloss level of the surface of the clear coat following thermoforming is less than about 10 gloss units.

6. The product according to claim 5 in which the gloss is less than about 5 gloss units.

7. The product according to claim 1 in which the fine particulate filler comprises finely divided silica particles.

8. The product according to claim 1 in which the backing sheet comprises a semi-rigid resinous sheet selected from the group consisting of polyolefin, ABS, polycarbonate, and blends thereof.

9. The product according to claim 1 in which the backing sheet comprises a foamed resinous material.

10. The product according to claim 9 in which the foamed resinous material comprises polypropylene.

11. The product according to claim 1 in which the dry paint transfer sheet has been subjected to elongation greater than about 50% during said thermoforming.

12. The product according to claim 1 in which the fine particulate filler is present in the outer clear coat layer in an amount below about five parts by weight per one hundred parts of the total resinous binder solids contained in the outer clear coat layer.

13. A decorative and structural plastic skin component for use as a functional covering for interior automotive instrument panels, comprising a thermoplastically formable dry paint film having a protective outer clear coat layer comprising a polymeric material, and a self-supporting thermoplastically formable resinous backing sheet adhered to the dry paint film on a side thereof opposite from an outer surface of the outer clear coat layer, the outer surface of the clear coat layer having a transferred surface micro-roughness to reduce the surface gloss thereof, the composite of the dry paint film and the backing sheet having been subjected to thermoforming to thermoplastically elongate and thereby produce thereon a three-dimensionally shaped contoured outer surface, the clear coat layer containing uniformly dispersed filler particles in an amount below about 10 parts by weight per 100 parts of the total resinous binder solids contained in the outer clear coat, the combination of said transferred surface micro-roughness and said dispersed filler particles producing on the outer surface of the thermoformed clear coat layer a substantially uniformly dispersed micro-roughness forming a low gloss having a measured 60 degree gloss level of less than about 15 gloss units.

14. The product according to claim 13 in which the clear coat layer comprises an alloy of a fluoropolymer resin and an acrylic resin.

15. The product according to claim 13 in which the fine particulate filler is present in the outer clear coat layer in an amount below about five parts by weight per one hundred parts of the total resinous binder solids contained in the outer clear coat layer.

16. The product according to claim 13 including a substantial level of UV absorber contained in the outer clear coat layer to inhibit UV degradation of the laminate component parts below the outer clear coat layer.

17. The product according to claim 5 in which the dry paint transfer sheet has been subjected to elongation greater than about 50% during thermoforming.

18. The product according to claim 13 in which the 60 degree gloss level of the surface of the outer clear coat following thermoforming is less than about 10 gloss units, and in which the dry paint transfer sheet has been subjected to elongation greater than about 50% during thermoforming.

* * * * *

UNITED STATES PATENT AND TRADEMARK OFFICE
CERTIFICATE OF CORRECTION

PATENT NO. : 5,750,234
DATED : May 12, 1998
INVENTOR(S) : John R. Johnson; Diana M. Mercier It is certified that error appears in the above-indentified patent and that said Letters Patent is hereby corrected as shown below:

Column 14, line 50, change "Mylar" to -- Hylar --.
Column 16, line 22, replace "mirco-roughness surface" with -- surface micro-roughness --.

Signed and Sealed this

Ninth Day of March, 1999

Attest:

Q. TODD DICKINSON

Attesting Officer

Acting Commissioner of Patents and Trademarks